US009158529B2

(12) United States Patent
Jeon

(10) Patent No.: US 9,158,529 B2
(45) Date of Patent: Oct. 13, 2015

(54) METHOD FOR MAINTAINING FIRMWARE OF DIGITAL PROTECTIVE RELAY AND DIGITAL PROTECTIVE RELAY PERFORMING THE SAME

(71) Applicant: LSIS CO., LTD., Anyan-Si, Gyeonggi-Do (KR)

(72) Inventor: Byung Joon Jeon, Cheongju-Si (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 0 days.

(21) Appl. No.: 13/651,244

(22) Filed: Oct. 12, 2012

(65) Prior Publication Data
US 2013/0232478 A1 Sep. 5, 2013

(30) Foreign Application Priority Data
Mar. 2, 2012 (KR) ........................ 10-2012-0021641

(51) Int. Cl.
*G06F 9/445* (2006.01)
*H01H 71/00* (2006.01)
(52) U.S. Cl.
CPC *G06F 8/65* (2013.01); *G06F 8/665* (2013.01); *H01H 71/00* (2013.01)
(58) Field of Classification Search
None
See application file for complete search history.

(56) References Cited

U.S. PATENT DOCUMENTS

| 4,124,833 | A  | * | 11/1978 | Stoger ........................... 335/186 |
| 6,247,168 | B1 | * | 6/2001  | Green ........................... 717/176  |
| 7,185,331 | B2 | * | 2/2007  | Talati et al. ................... 717/168  |
| 2003/0154471 | A1 | * | 8/2003 | Teachman et al. ............ 717/171 |
| 2004/0044997 | A1 | * | 3/2004 | Talati et al. ................... 717/170 |
| 2004/0093598 | A1 |   | 5/2004 | Haga et al. |
| 2005/0141025 | A1 | * | 6/2005 | Hanada ........................ 358/1.15 |
| 2007/0143303 | A1 |   | 6/2007 | Cho |
| 2007/0294385 | A1 |   | 12/2007 | Kapadekar et al. |

(Continued)

FOREIGN PATENT DOCUMENTS

| CN | 200976600 | 11/2007 |
| CN | 101952922 | 1/2011 |

(Continued)

OTHER PUBLICATIONS

Instructions for the FP 5000 Protective Relay, Cutler-Hammer Instruction Leaflet IL 17569C, 2005, 213 pages, [retrieved on Feb. 7, 2014], Retrieved from the Internet: <URL:http://es.eaton.com/protectiverelays/Documentation/FP5000/66A2053.pdf>.*

(Continued)

*Primary Examiner* — Thuy Dao
*Assistant Examiner* — Geoffrey St Leger
(74) *Attorney, Agent, or Firm* — Lee, Hong, Degerman, Kang & Waimey

(57) ABSTRACT

A firmware updating method for a digital protective relay having a plurality of modules includes receiving firmware update related information from a master device, notifying necessity of firmware update to a target module having a firmware to be updated based on the firmware update related information, receiving a firmware update ready message from the target module, and downloading a firmware from the master device into the target module and installing the downloaded firmware. According to the method, without opening a distributing board or removing an enclosure of a digital protective relay for updating a firmware of the digital protective relay, reduction of time and costs for on-site engineering and maintenance can be expected.

8 Claims, 4 Drawing Sheets

(56) References Cited

U.S. PATENT DOCUMENTS

| | | |
|---|---|---|
| 2008/0028395 A1 | 1/2008 | Motta et al. |
| 2010/0031243 A1* | 2/2010 | Jakubowski .................. 717/168 |
| 2010/0169876 A1* | 7/2010 | Mann ............................ 717/170 |
| 2011/0231834 A1 | 9/2011 | Kim |

FOREIGN PATENT DOCUMENTS

| | | |
|---|---|---|
| JP | 09191553 A * | 7/1997 |
| JP | 2004-274964 | 9/2004 |
| JP | 2005006370 A * | 1/2005 |
| JP | 2009-187456 | 8/2009 |
| JP | 2011-004242 | 1/2011 |

OTHER PUBLICATIONS

Sperl, J., et al., Upgrading Your Protective Relays—When Theory Meets Reality, 63rd Annual Conference for Protective Relay Engineers, 2010, pp. 1-8, [retrieved on Jun. 17, 2015], Retrieved from the Internet: <URL:http://ieeexplore.ieee.org/>.*

Instruction Manual for Feeder Protection System BE1-11f, Basler Electric, Mar. 2011, 432 pages, [retrieved on Jul. 21, 2014], Retrieved from the Internet: <URL: https://www.eiseverywhere.com/file_uploads/9a970a07d4babf25ec0cd356deebda2d_2_BE1_11F_9424200990H.pdf>.*

Korean Intellectual Property Office Application Serial No. 10-2012-0021641, Office Action dated Aug. 29, 2013, 4 pages.

European Patent Office Application Serial No. 12189172.5, Search Report dated Jul. 9, 2013, 8 pages.

The State Intellectual Property Office of the People's Republic of China Application Serial No. 201210401163.1, Office Action dated Feb. 2, 2015, 6 pages.

* cited by examiner

METHOD FOR MAINTAINING FIRMWARE OF DIGITAL PROTECTIVE RELAY AND DIGITAL PROTECTIVE RELAY PERFORMING THE SAME

CROSS-REFERENCE TO RELATED APPLICATION

Pursuant to 35 U.S.C. §119(a), this application claims the benefit of earlier filing date and right of priority to Korean Application No. 10-2012-0021641, filed on Mar. 2, 2012, the contents of which is incorporated by reference herein in its entirety.

BACKGROUND OF THE INVENTION

1. Field of the Invention

This specification relates to a method for maintaining firmware of a digital protective relay and a digital protective relay performing the same.

2. Background of the Invention

A protective relay is an apparatus having a command function of cutting off a portion from a circuit when a fault state, such as short-circuit, eddy current, overcurrent or the like occurs at the corresponding portion of the circuit. There are various types of protective relays. Examples of the various types of protective relays include an undervoltage relay operating when a circuit voltage is lowered, a temperature relay for detecting a danger temperature, a power relay operating when a power level is more than a predetermined value, a distance relay for detecting a breakdown position of a power transmission line, a differential relay operating when a current ratio of primary and secondary windings of a transformer is more than a predetermined value, a ground relay notifying a ground fault of a power transmission line, and the like.

As one example of the protective relay, a digital protective relay (hereinafter, referred to as "relay") is an apparatus for protecting an electric circuit by preventing an affection due to a breakdown fault in a manner of sensing a voltage and a current generated during operation of the electric circuit and accurately running relay elements, such as overcurrent, open phase, phase unbalance, reversed phase, overvoltage, undervoltage and the like, based on a set value and a set operating (running) time. The series of operations of the digital protective relay are enabled by a firmware. The firmware has to be upgraded to upgrade the existing functions or support added functions. A firmware downloaded from a Personal Computer (PC) is stored in a Read Only Memory (ROM) of the relay. Upon turning the relay on, a Central Processing Unit (CPU) reads out firmware codes stored in the ROM and executes the code to run the relay.

In the meantime, when a firmware for every functional module mounted in the relay is updated in the related art, a PC or laptop computer is connected to a connector (for interface) disposed in each functional module. Accordingly, assuming that n functional modules are present, n times of connection have to be executed and n*T time (here, T denotes a time spent for firmware update) is consumed.

Therefore, development of a more simplified, intelligent method for updating the firmware of the relay is required.

SUMMARY OF THE INVENTION

Therefore, an aspect of the detailed description is to provide a method for updating (or maintaining) a firmware of a digital protective relay, which is simple and intelligent, and a digital protective relay performing the same.

To achieve these and other advantages and in accordance with the purpose of this specification, as embodied and broadly described herein, there is provided a firmware updating method for a digital protective relay having a plurality of modules, the method including receiving firmware update related information from a master device, notifying necessity of firmware update to a target module having a firmware to be updated based on the firmware update related information, receiving a firmware update ready message from the target module, and downloading a firmware from the master device into the target module and installing the downloaded firmware.

In one aspect of the detailed description, the digital protective relay and a master device may be connected to each other via one input/output interface. Also, the firmware update related information may include at least one of a type of firmware, a version of firmware or an updated date.

In one aspect of the detailed description, the method may further include, after the installation step, transmitting an update success message from the target module to the master device.

In one aspect of the detailed description, the downloading and installing of the firmware may be executed in a sequential or simultaneous manner when the target module is present in plurality.

To achieve these and other advantages and in accordance with the purpose of this specification, as embodied and broadly described herein, there is provided a digital protective relay having a plurality of modules, the digital protective relay including a main processing module to receive firmware update related information from a master device, notify necessity of firmware update to a target module having a firmware to be updated based on the firmware update related information, and download the firmware from the master device, and a target module to transmit a firmware update ready message to the main processing module in response to reception of the firmware update notification, and download the firmware from the main processing module and install the firmware.

In one aspect of the detailed description, the digital protective relay and a master device may be connected to each other via one input/output interface. Also, the firmware update related information may include at least one of a type of firmware, a version of firmware or an updated date.

In one aspect of the detailed description, the target module may transmit an update success message to the master device. Here, the downloading and installing of the firmware may be executed in a sequential or simultaneous manner when the target module is present in plurality.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Embodiments of the present disclosure will be described below in detail with reference to the accompanying drawings where those components are rendered the same reference number that are the same or are in correspondence, regardless of the figure number, and redundant explanations are omitted. In describing the present disclosure, if a detailed explanation for a related known function or construction is considered to unnecessarily divert the gist of the present disclosure, such explanation has been omitted but would be understood by those skilled in the art. The accompanying drawings are used to help easily understood the technical idea of the present disclosure and it should be understood that the idea of the present disclosure is not limited by the accompanying drawings. The idea of the present disclosure should be construed to extend to any alterations, equivalents and substitutes besides the accompanying drawings.

Figure 1:
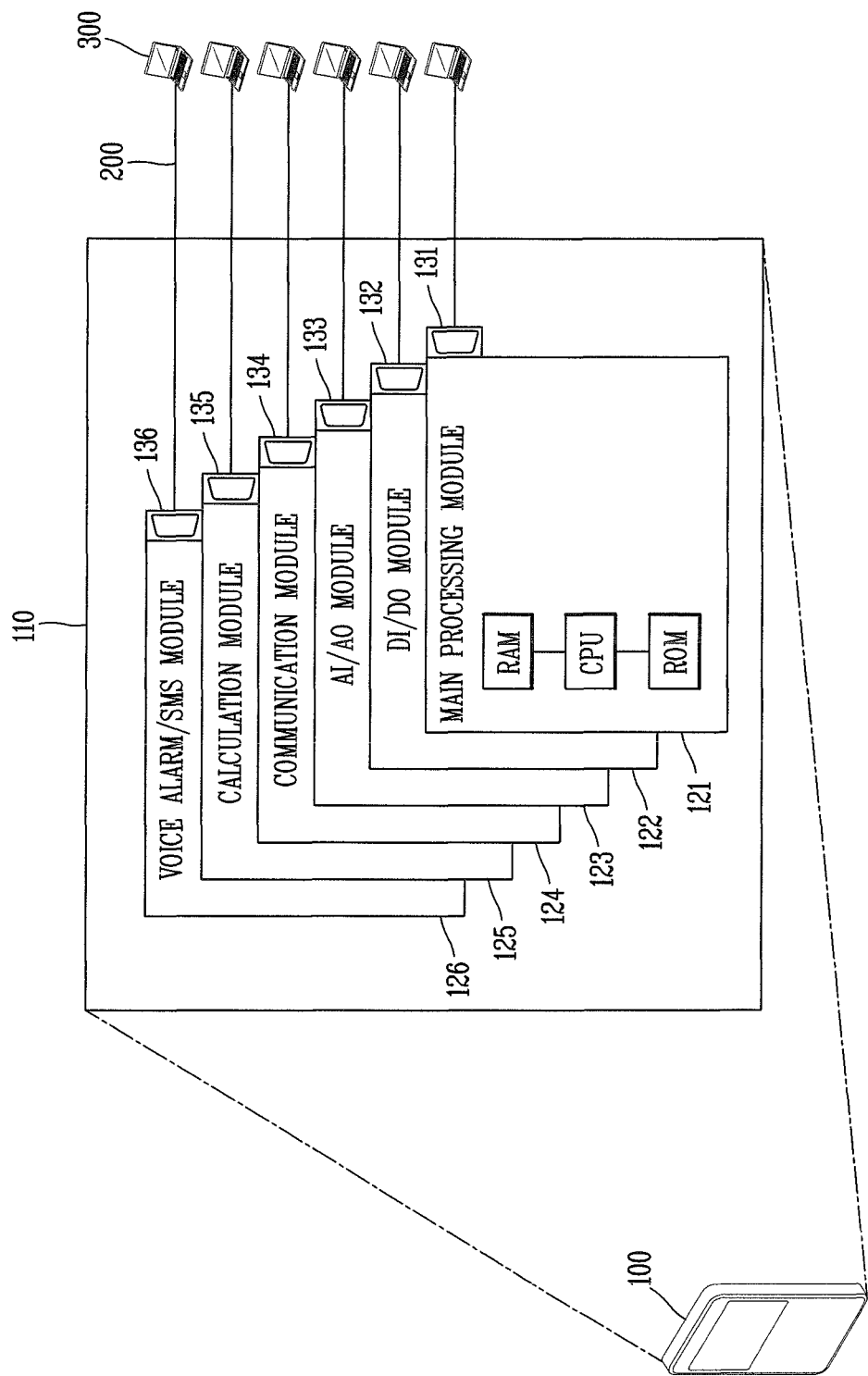
FIG. 1 is a view showing a connection between a digital protective relay and a master device according to the related art.

FIG. 1 is a view showing a connection between a digital protective relay 100 and a master device 300 according to the related art. The digital protective relay 100 may include a plurality of functional modules 110. The plurality of functional modules 110, for example, may include a main processing module 121 that controls operations of the digital protective relay, such as executing a protective relaying function by collecting information from each module and instructing an operation to a corresponding module, a DI/DO module 122 that receives an input contact value and outputs a digital signal to send to an external device, an AI/AO module 123 that receives or outputs an analog value, a communication module 124 that communicates with an upper monitoring panel, a calculation module 125 that processes a quantity of power into data by sensing a voltage/current, a voice alarm/SMS transmission module 126 that performs a voice alarm alerting function and an SMS transmission function, a screen display module HMI (not shown) that informs of a quantity of power and a current state, and the like.

Also, the functional modules may include separate interfaces (or communication) ports 131, 132, 133, 134, 135 and 136, respectively. A firmware may be stored in a flash memory of each of the functional modules, and a CPU of each functional module may activate the firmware to run the module. Also, the digital protective relay may be driven by exchange of information between the main processing module and other functional modules via communication.

To update the firmware, a master device 300 (for example, PC) may be connected to each functional module via communication. The communication connection may be allowed by the ports 131, 132, 133, 134, 135 and 136, of the respective functional modules. Therefore, when every functional module is required to be updated, a manager of the digital protective relay suffers from repeating the communication connection between the master device and the functional modules by the number of times corresponding to the number of the functional modules (6 ports in FIG. 1).

Figure 2:
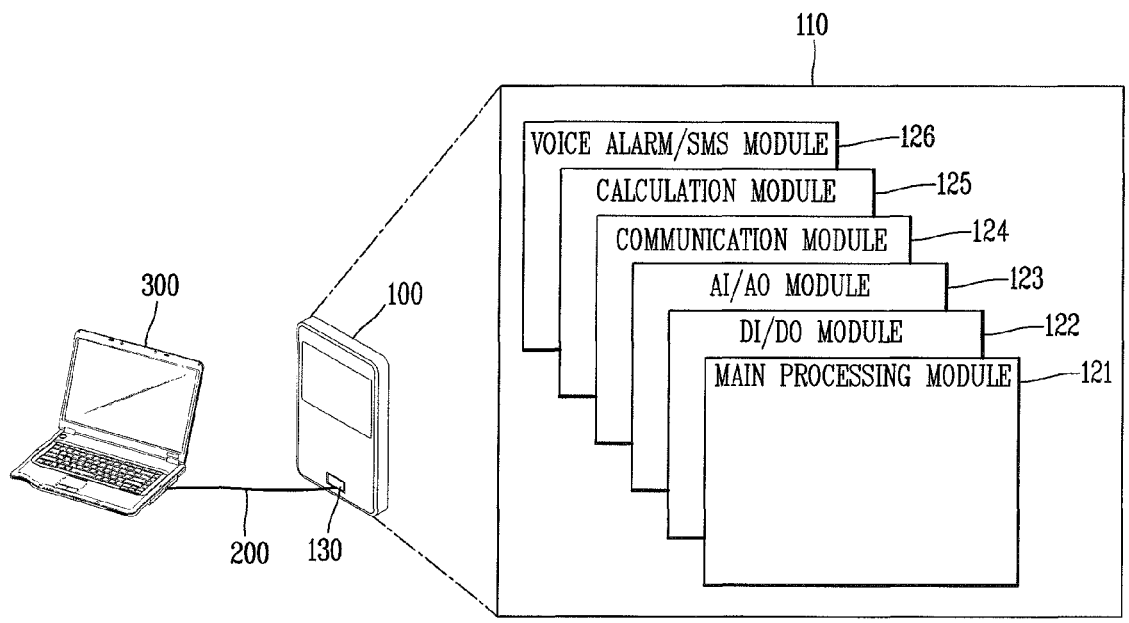
FIG. 2 is a view showing a connection between a digital protective relay and a master device in accordance with one exemplary embodiment.

FIG. 2 is a view showing a connection between a digital protective relay and a master device in accordance with one exemplary embodiment. Referring to FIG. 2, the digital protective relay 100 in accordance with one exemplary embodiment may include one communication or interface port 130. The digital protective relay 100 may include a plurality of functional modules 121, 122, 123, 124, 125 and 126 therein. The digital protective relay 100 may also further include other functional modules in addition to those shown in FIG. 2. The digital protective relay 100 may be connected to the master device 300 via a communication line 200.

The communication line 200 is illustrated as a wired communication line. However, if the communication or interface port 130 has a wireless communication function according to one exemplary embodiment, the communication line 200 may be implemented as a wireless communication line. Here, the master device 300 and the digital protective relay 100 may communication with each other via wireless communication.

With the one communication or interface port 130 employed, the digital protective relay 100 shown in FIG. 2 may provide one integrated connection point with the master device 300 when firmware updating for each functional module is required. Also, the communication or interface port 130 may be formed on or attached to an outside, preferably, a front surface of the digital protective relay 100, thereby allowing for updating the firmware of each functional module without removing an enclosure of the digital protective relay 100.

Figure 3:
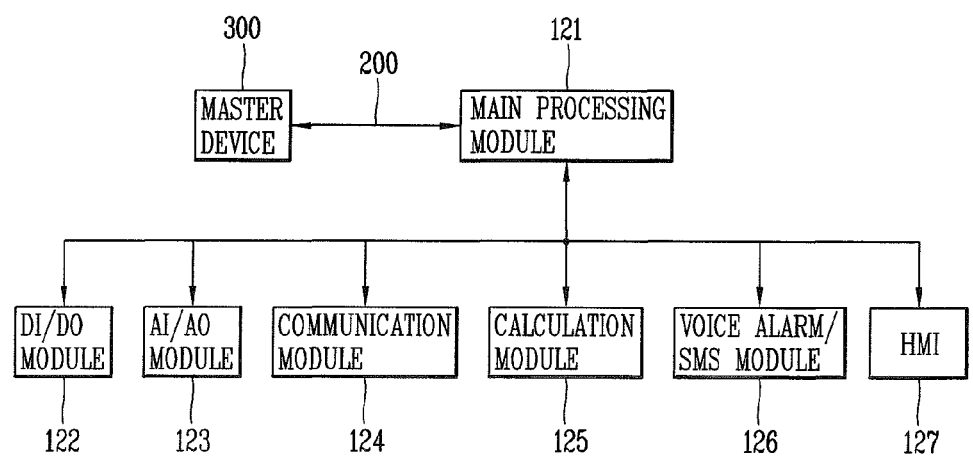
FIG. 3 is a block diagram of the digital protective relay in accordance with the one exemplary embodiment.

FIG. 3 is a block diagram of a digital protective relay in accordance with one exemplary embodiment. Referring to FIG. 3, the main processing module 121 of the digital protective relay 100 may be connected to each of other functional modules 122, 123, 124, 125, 126 and 127. Unlike the structure shown in FIG. 1, the functional modules 122, 123, 124, 125, 126 and 127 of the digital protective relay 100 may be connected to the master device 300 via the main processing module 121 to be able to communicate with the master device 300.

The main processing module 121 and the other functional modules 122, 123, 124, 125, 126 and 127 may be connected in a parallel or serial communication manner, exchanging data with each other.

When the master device 300 determines that firmware update for each of the functional modules 121 to 127 is required, the master device 300 may transmit information related to the firmware update to the main processing module 121. The firmware update related information may include at least one of which functional module is to be updated, an update version or an update date.

Upon reception of the firmware update related information, the main processing module 121 may interpret a specific functional module based on the information, and notify the necessity of the firmware update to the corresponding functional module. Also, the main processing module 121 may download a firmware to update (namely, a new version of firmware) from the master device 300, and transmit the downloaded firmware to the corresponding functional module such that the corresponding functional module can download the firmware. The corresponding functional module may record or install the firmware in its ROM area. The firmware update process may thusly be completed.

In the meantime, upon reception of the firmware update related information with respect to another functional module, the main processing module 121 may repeat the aforementioned series of update processes. The update processes may be performed in a simultaneous or sequential manner when the functional modules are provided in plurality.

Figure 4:
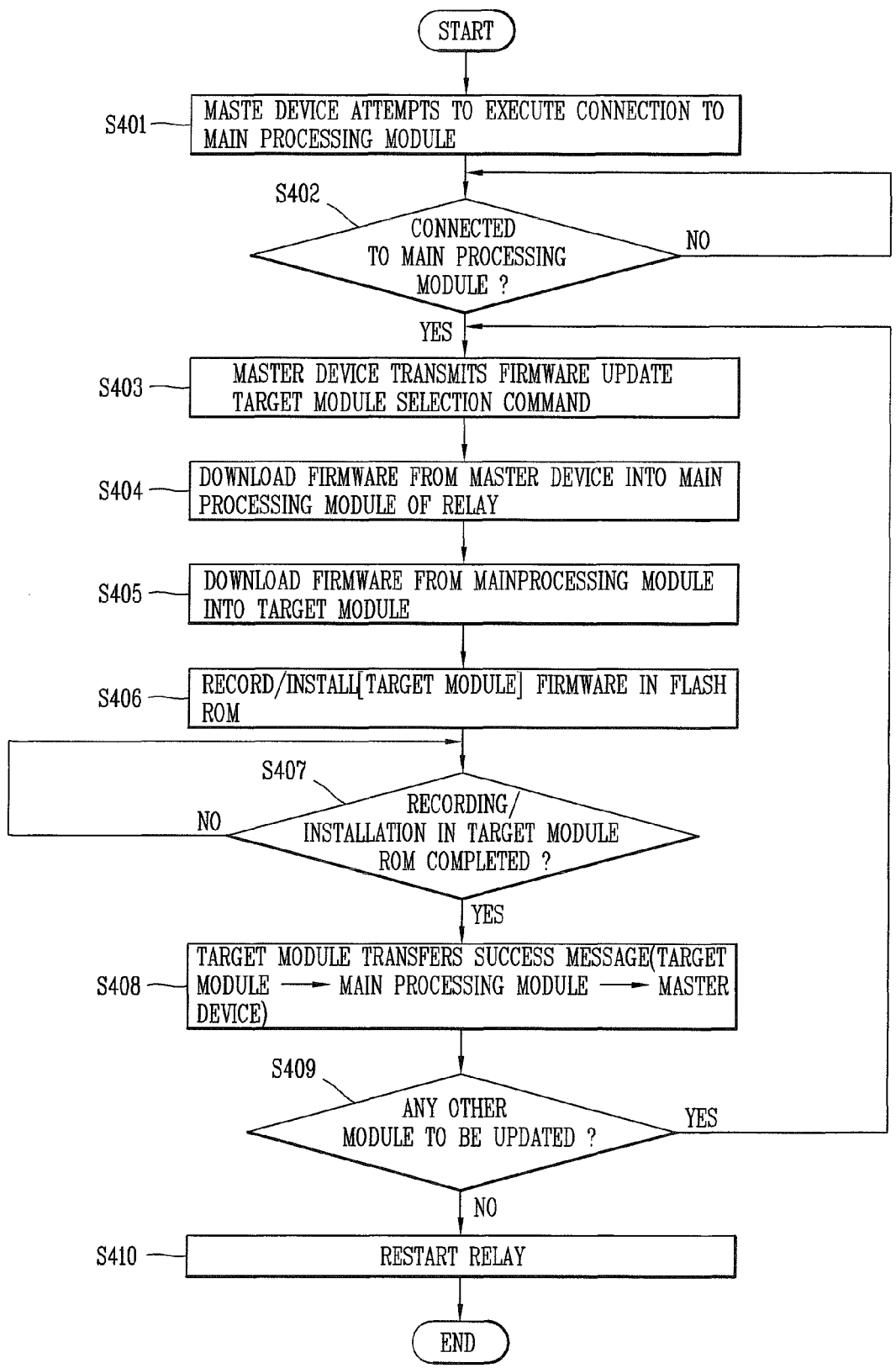
FIGS. 4 and 5 are flowcharts showing a firmware updating method in accordance with one exemplary embodiment.
Figure 5:
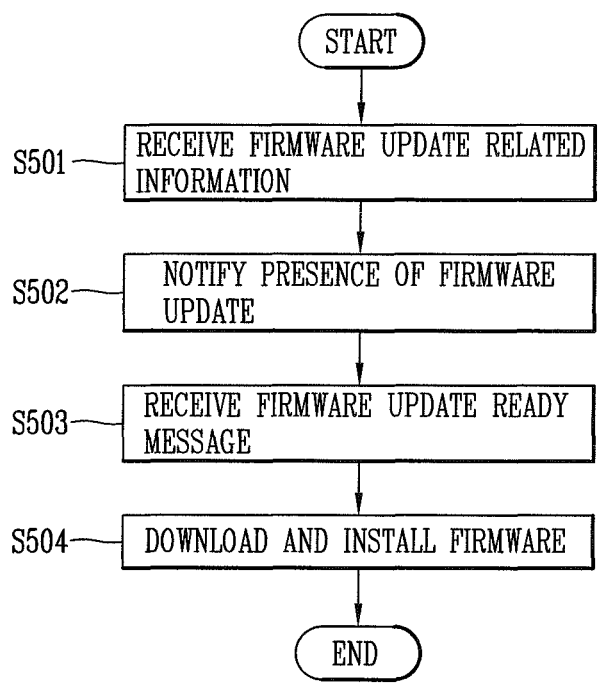

FIGS. 4 and 5 are flowcharts showing a firmware updating method in accordance with one exemplary embodiment. Description of FIG. 4 will be given with reference to FIG. 3. According to the firmware updating method, the master device 300 may attempt to connect communication with the main processing module 121 (S401). It may be determined or decided whether or not the master device 300 is in a connected state with the main processing module 121 (S402). If it is determined or decided in the step S402 that they are not in the connected state, checking on the connection may be executed again.

When the connection is normally executed, the main processing module 121 may receive a command from the master device 300 to select a target module for the firmware update (S403). Or, the main processing module 121 may receive firmware update related information from the master device 300, and recognize which target module has a firmware necessary to be updated.

Next, firmware downloading from the master device 300 to the main processing module 121 of the digital protective relay 100 may be executed (S404). The main processing module 121 may then download a firmware into the target module 121 to 127 (S405). The target module may record or install the downloaded firmware in its own ROM area (for example, a flash ROM area) (S406).

Afterwards, it may be determined or decided whether or not the recording or installation of the firmware in the ROM area of the target module has been completed (S407). When it is determined or decided that the firmware recording or installation has not been completed, the determination or decision may be executed again.

When the recording or installation has been completed, the method goes to a step S408. Upon the completion of the recording or installation, the target module may transmit or transfer an update success message to the main processing module 121 or the master device 300.

Then, the main processing module 121 may determine whether or not any additional target module has a firmware necessary to be updated (S409). The step S409 may be executed based on the firmware update related information received from the master device 300, or executed by checking a newly received firmware update related information if the newly received information is present. Also, the main processing module 121 may execute the step S409 by comparing firmware information (for example, version number) for each of various functional modules existing in the master device 300 with firmware information (for example, version number) installed in each of the various functional modules 122 to 127.

When it is determined that there is not an additional target module having a firmware to be updated, the digital protective relay may be restarted to execute a system maintenance in response to the firmware updated.

When there is a target module having a firmware to be updated, the method goes to the step S403 and may repeat the procedure from the step S403 to S408.

A firmware updating method shown in FIG. 5 is a method for updating a firmware of a digital protective relay having a plurality of modules, and may include receiving firmware update related information from a master device (S501), notifying necessity of firmware update to a target module having a firmware to be updated based on the firmware update related information (S502), receiving a firmware update ready message from the target module (S503), and downloading a firmware from the master device into the target module and installing the downloaded firmware (S504). Although not shown separately in FIG. 5, the method may include the procedures and method in accordance with the one exemplary embodiment described with reference to FIGS. 2 to 4.

The digital protective relay and the master device may be connected to each other via one input/output interface. The firmware update related information may include at least one of information related to a target module having firmware necessary to be updated, a firmware version or a firmware update date.

The method may further include transmitting an update success message from the target module to the master device after the installation step (S504).

Also, when the target module is present in plurality, the step S504 of downloading the firmware and installing the downloaded firmware may be executed with respect to all of the plurality of target modules in a sequential or simultaneous manner.

As described above, in accordance with one exemplary embodiment, without opening a distributing board or removing an enclosure of a digital protective relay for updating a firmware of the digital protective relay, the firmware update for the relay may be executed via an interface (or communication) port mounted onto a front surface of the relay, expecting effects of reduction of time and costs for on-site engineering and maintenance.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A firmware updating method for a digital protective relay having a plurality of modules each comprising a central processing unit (CPU), at least one memory and at least one communication channel, the method comprising:
    determining whether a master device has been connected with a main processing module of the plurality of modules;
    receiving firmware update related information from the master device upon determining that the master device has been connected;
    recognizing a target module of the plurality of modules that has firmware to be updated based on the received firmware update related information;
    notifying necessity of a firmware update to the recognized target module;
    receiving a firmware update ready message from the recognized target module;
    downloading the firmware from the master device into the recognized target module after receiving the firmware update ready message; and
    installing the downloaded firmware, wherein the digital protective relay and the master device are connected to each other via a wireless interface, and wherein each of the other of the plurality of modules may be connected to the master device via the main processing module, and wherein downloading and installing the firmware are simultaneously performed when a plurality of target modules are present.

2. The method of claim 1, wherein the firmware update related information comprises at least a type of firmware, a version of firmware or a date the firmware was updated.

3. The method of claim 1, further comprising:
transmitting an update success message from the target module to the master device after successfully installing the downloaded firmware.

4. The method of claim 1, wherein downloading and installing the firmware are sequentially performed when a plurality of target modules are present.

5. A digital protective relay having a plurality of modules each comprising a central processing unit (CPU), at least one memory and at least one communication channel, the digital protective relay comprising:

a main processing module configured to determine whether a master device has been connected with the main processing module, receive firmware update related information from the master device upon determining that the master device has been connected, recognize a target module of the plurality of modules that has firmware to be updated based on the received firmware update related information, notify necessity of a firmware update to the recognized target module, receive a firmware update ready message from the recognized target module and download the firmware from the master device into the recognized target module after receiving the firmware update ready message; and the target module configured to transmit the firmware update ready message to the main processing module in response to receiving the firmware update notification, to download the firmware from the main processing module and to install the downloaded firmware, wherein the digital protective relay and the master device are connected to each other via a wireless interface, wherein each of the other of the plurality of modules may be connected to the master device via the main processing module, and wherein the main processing module is further configured to simultaneously download and install the firmware when a plurality of target modules are present.

6. The digital protective relay of claim 5, wherein the firmware update related information comprises at least a type of firmware, a version of firmware or a date the firmware was updated.

7. The digital protective relay of claim 5, wherein the main processing module is further configured to sequentially or simultaneously download and install the firmware when a plurality of target modules are present.

8. The digital protective relay of claim 5, wherein the main processing module is further configured to transmit an update success message from the target module to the master device after successfully installing the downloaded firmware.

* * * * *